L. LeMAY.
CAR-WHEEL.
No. 181,854. Patented Sept. 5, 1876.
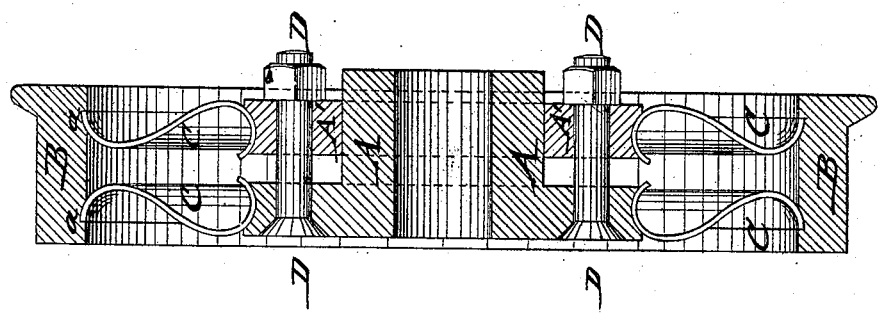
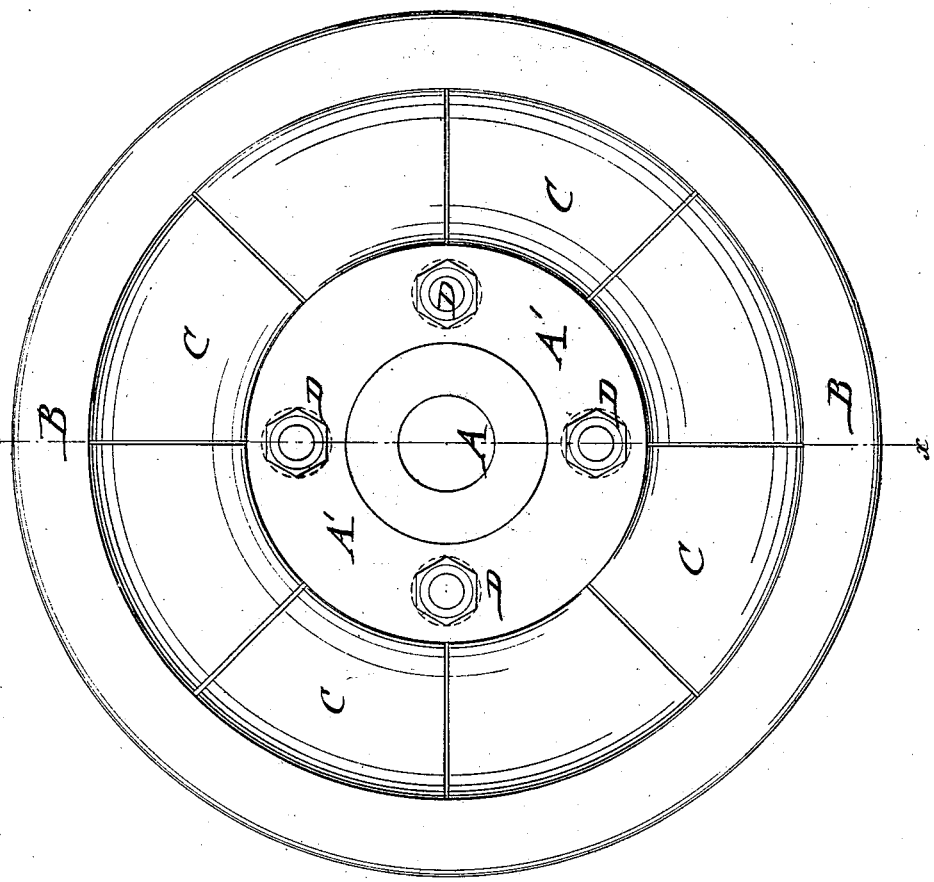
WITNESSES:
H. Rydquist.
John Goethals
INVENTOR:
L. LeMay
BY Munn
ATTORNEYS.

UNITED STATES PATENT OFFICE.

LOUIS LE MAY, OF HUDSON, NEW YORK.

IMPROVEMENT IN CAR-WHEELS.

Specification forming part of Letters Patent No. 181,854, dated September 5, 1876; application filed May 22, 1876.

*To all whom it may concern:*

Be it known that I, LOUIS LE MAY, of Hudson, Columbia county, New York, have invented a new and Improved Car-Wheel, of which the following is a specification:

Figure 1 represents a front elevation of my improved car-wheel; and Fig. 2, a vertical transverse section of the same on line $x$ $x$, Fig. 1.

Similar letters of reference indicate corresponding parts.

My invention relates to an improved construction of feathering car-wheels; and it consists of a car-wheel in which the tire or rim is connected to the hub, and supported by a radial spring-web seated on the hub and tire. The hub is made of a flanged section and a removable ring-section, secured by connecting-bolts.

In the drawing, A represents the hub of my improved car-wheel; B, the tire, and C the hub and tire connecting spring disks or supports. The springs C are made of S shape in cross-section, and either made in one piece or of any suitable number of radial pieces, as in the drawing, the springs forming the web of the wheel, which, by their elasticity, form a feathering car-wheel of superior quality. The double web is made of two symmetrically-arranged spring disks or pieces, which are set, by their upper ends, against recesses or shoulders of the rim, and seated, by their curved lower ends, in the concaved circumference of the hub-sections. The hub A is cast or wrought with a flanged extension at one end, that forms the seat for one series of springs, while a movable ring-section, A', secured rigidly by bolts and nuts D, forms the seat for the symmetrical series of springs C. When the hub-sections are properly and tightly bolted together the springs are firmly secured in position, and form a wheel of considerable strength and rigidity, but of sufficient elasticity to reduce the effect of the shocks and make it more durable and serviceable for passenger and other cars.

Having thus described my invention, I claim as new and desire to secure by Letters Patent—

The combination with hub A, having flanged extension at one end, movable ring-section A', and the rim B, having shoulders $a$, of the double web of S-shaped springs C, arranged substantially as and for the purpose specified.

LOUIS LE MAY.

Witnesses:
PATRICK McENANY,
FREDRICK RIETZEL.